United States Patent
Fish

(10) Patent No.: US 9,798,916 B2
(45) Date of Patent: Oct. 24, 2017

(54) SYMBOLIC PRINT TO ELECTRONIC MEDIA BRIDGE

(71) Applicant: Kimberly Anne Fish, Naples, FL (US)

(72) Inventor: Kimberly Anne Fish, Naples, FL (US)

( * ) Notice: Subject to any disclaimer, the term of this patent is extended or adjusted under 35 U.S.C. 154(b) by 0 days.

(21) Appl. No.: 15/264,347

(22) Filed: Sep. 13, 2016

(65) Prior Publication Data

US 2017/0076006 A1    Mar. 16, 2017

Related U.S. Application Data

(60) Provisional application No. 62/219,121, filed on Sep. 15, 2015.

(51) Int. Cl.
   *G06K 19/00*   (2006.01)
   *G06K 7/14*    (2006.01)
   *G06F 17/30*   (2006.01)

(52) U.S. Cl.
   CPC ..... *G06K 7/1417* (2013.01); *G06F 17/30725* (2013.01)

(58) Field of Classification Search
   USPC ................. 235/435, 439, 454, 462
   See application file for complete search history.

(56) References Cited

U.S. PATENT DOCUMENTS

| | | | |
|---|---|---|---|
| 7,039,599 B2 | 5/2006 | Merriman et al. | |
| 7,085,682 B1 | 8/2006 | Heller et al. | |
| 7,349,827 B1 | 3/2008 | Heller et al. | |
| 7,844,488 B2 | 11/2010 | Merriman et al. | |
| 2014/0033286 A1* | 1/2014 | Zhang | H04L 63/083 726/7 |
| 2014/0331335 A1* | 11/2014 | Deschenes | G06K 17/0016 726/28 |

OTHER PUBLICATIONS

Edmonds, et al., Newspapers: By the Numbers, The State of the News Media 2013, May 7, 2013, The Pew Research Center's Project for Excellence in Journalism, http://www.stateofthemedia.org/2013/.

Unknown Author, Barcode Scanner, ZXing Team, Google Play Store, https://web.archive.org/web/20150906154341/https://play.google.com/store/apps/details?id=com.google.zxing.client.android&hl=en.

* cited by examiner

*Primary Examiner* — Matthew Mikels
(74) *Attorney, Agent, or Firm* — George F. Wallace

(57) ABSTRACT

A symbolic print-to-electronic media bridge system facilitates information flow across a computer network. Such a system can include a printed publication containing a print media instance with a printed symbolic key representation; a system agent with a media database having an electronic version of the print media instance stored therein; and a bridge agent having an output device and an optical input device to optically capture the printed symbolic key representation to provide a primary key. After such a capture, the bridge agent sends the primary key to the system agent, which references the electronic version and sends the same to the bridge agent for storage and subsequent output via the output device.

7 Claims, 2 Drawing Sheets

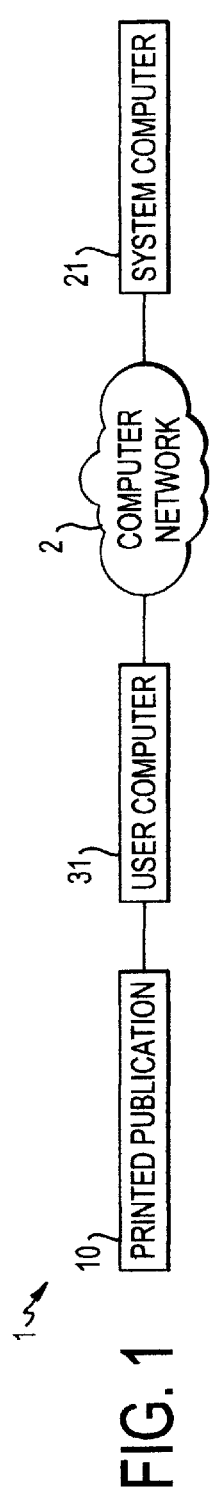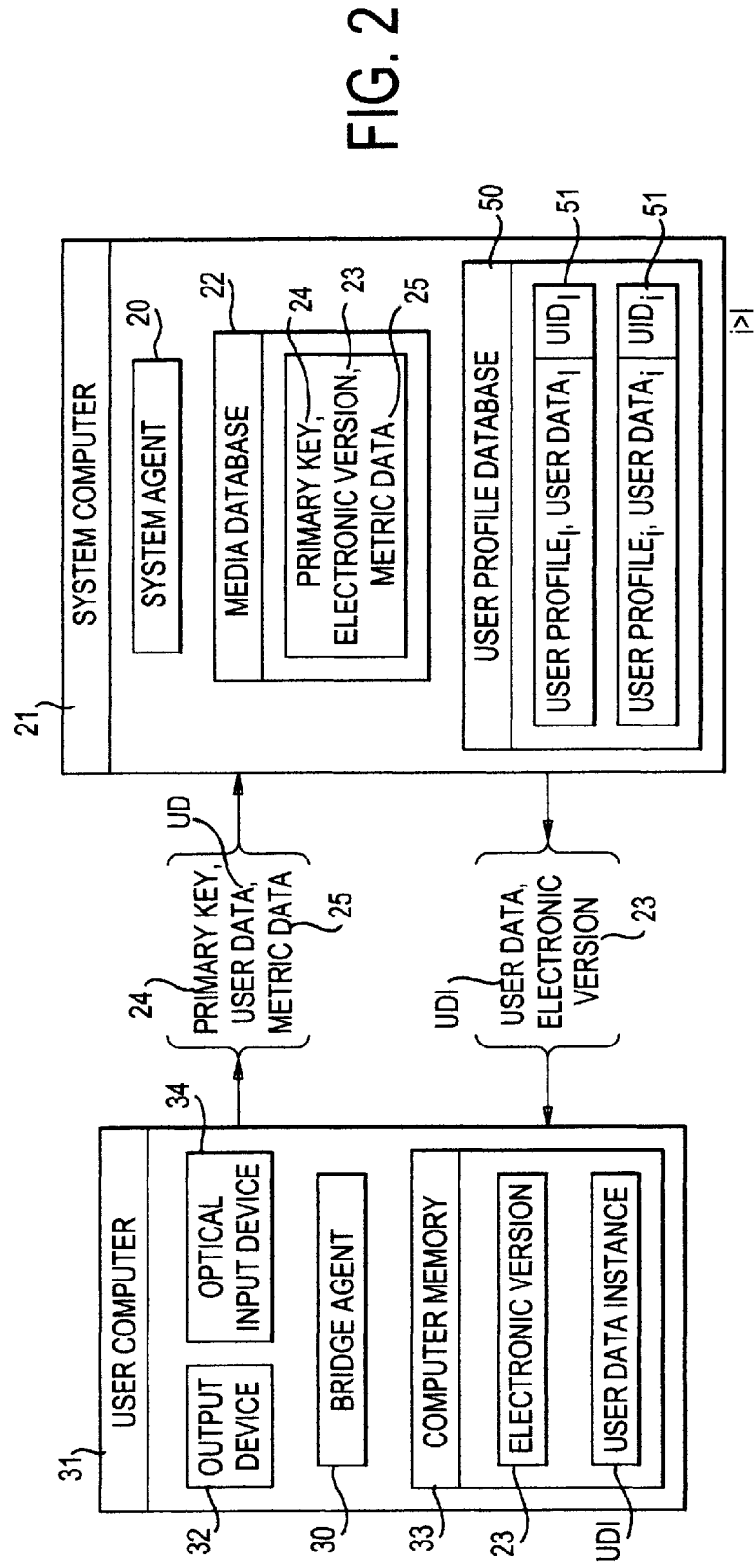

SYMBOLIC PRINT TO ELECTRONIC MEDIA BRIDGE

RELATED DOCUMENTS

This document is related to, incorporates by reference in its entirety, and claims the priority benefit of U.S. Provisional Patent Application Ser. No. 62/219,121, entitled "SYMBOL-BASED PRINT-TO-ELECTRONIC MEDIA BRIDGE," and filed on Sep. 15, 2015 by Kimberly Anne Fish.

FIELD OF THE INVENTION

The present invention relates to print media and electronic media, and more particularly, to bridging these two medias to facilitate information flow.

BACKGROUND OF THE INVENTION

Print media, such as newspapers, magazines, etc., include physical material upon which visually perceivable content can be printed and subsequently perceived by a viewer. Accordingly, print media are accompanied by time and cost logistics to effectuate production and distribution logistics.

Electronic media includes Internet content, e-books, e-magazines, etc. Though electronic media can require electronic hardware for end-user perception, significant financial and time costs are realized over printed content, as production (electronic copies) and distribution of electronic media can be almost instantaneous and highly efficient.

With the introduction of the Internet, electronic media has recognized substantial research and development efforts culminating is vast technological advancements, while print media has generally remained stagnant. Since this time, electronic media have also gained a substantial share of the news and entertainment information markets, while print media has recognized a substantial decline. In some settings and/or for some viewers/users, electronic media have arguably supplanted print media altogether. Accordingly, as print media has experienced a decline in readership, it has also experienced a decline in revenue streams via advertisements and circulation.

SUMMARY OF THE INVENTION

According to an exemplary embodiment of the present invention, a symbolic print to electronic media bridge system can facilitate information flow across a computer network, with such a system including a printed publication, a system agent, and a bridge agent.

In an exemplary aspect of the invention, a printed publication can include at least one print media instance having a printed symbolic key representation printed in association with the media instance.

In another exemplary aspect, a system agent can execute on a system computer communicatively connected to the computer network, with the system computer including a media database having stored therein an electronic version of the particular print media instance in association with a primary key represented by the symbolic key representation.

In an additional exemplary aspect, a bridge agent can execute on a user computer communicatively connected to the computer network, with the user computer having an output device, a computer memory and an optical input device configured to optically capture the printed symbolic key representation.

In still another exemplary aspect, in response to an optical capture of the symbolic key representation via the optical input device, the bridge agent can communicate, via the network, the primary key extracted from the optical capture of the symbolic key representation to the system agent. Thereafter, the system agent can access the electronic version from the media database based on the primary key and communicate, via the network, the electronic version to the user computer, which can store the electronic version in the computer memory and can subsequently output the electronic version via the output device.

In another exemplary embodiment, a system computer can further include a user-profile database having a plurality of user profiles stored therein, and upon receipt of the primary key, the system agent can store an instance of user data in one of the user profiles.

In a further exemplary aspect, the instance of user data can be provided by the bridge agent and/or the system agent.

In an additional exemplary aspect, in response to the optical capture of the symbolic key representation, the bridge agent can store, in the computer memory, an instance of user data associated with the particular user.

In a further exemplary aspect, after receipt of the primary key, the system agent can store, in the media database, metric data associated with the primary key.

In still another exemplary aspect, in response to the optical capture of the symbolic key representation, the bridge agent can communicate, via the network, the metric data to the system agent.

In still a further exemplary aspect, in response to the optical capture of the symbolic key representation, the bridge agent can store, in the computer memory, a user data instance.

These and other exemplary embodiments and aspects are described herein.

BRIEF DESCRIPTION OF THE DRAWINGS

FIG. 1 illustrates an overview perspective of an exemplary embodiment of the present invention, in which a user computer and printed publication are logical associated, and the user computer and system computer are communicatively connected via a computer network.

FIG. 2 illustrates a logical overview of an exemplary user computer and exemplary system computer.

DETAILED DESCRIPTION

Figure 3:
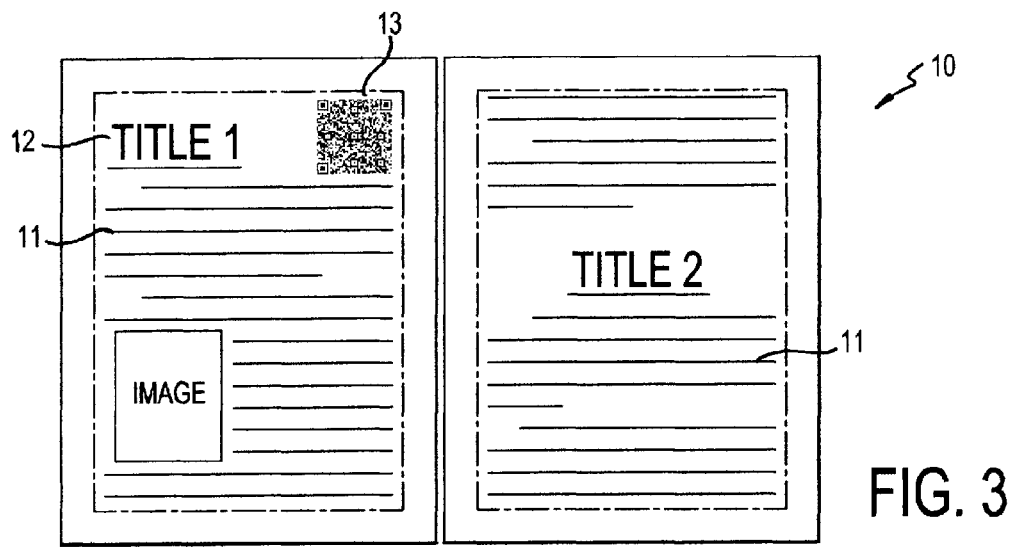
FIG. 3 illustrates an exemplary printed publication having a print media instance including a printed symbolic key representation printed in association with the print media instance.

It is an object of the present invention to provide a symbolic print to electronic media bridge system.

It is another object of the present invention to provide a symbolic print to electronic media bridge, which facilitate information flow over a computer network.

These and other objects are expressly and apparently provided via the illustrative embodiments described herein.

It should be noted that this disclosure includes a plurality of embodiments, each having a plurality of elements and/or aspects, and such elements and/or aspects need not necessarily be interpreted as being conjunctively required by one or more embodiments of the present invention. Rather, all combinations of all elements and/or aspects described herein can enable a separate embodiment of the present invention, which may be claimed with particularity in this or in any future filed Non-Provisional Patent Application. Moreover, any particular structure, arrangement, and/or functional logic disclosed herein, whether expressly or implicitly, are to be construed strictly as illustrative and enabling, and not necessarily limiting. Therefore, it is expressly set forth that such structure, arrangement, and functional logic, independently or in any combination of one of more thereof, are merely illustratively representative of one or more elements and/or aspects of one or more embodiments of the present invention and are not to be construed as necessary in a strict sense.

Further, to the extent the same element or aspect is defined differently anywhere within this disclosure, whether expressly or implicitly, the broader definition is to take absolute precedence, with the distinctions encompassed by the narrower definition to be strictly construed as optional.

Illustratively, perceived benefits of the present invention can include functional utility, whether expressly or implicitly stated herein, or apparent herefrom. However, it is expressly set forth that these benefits are not intended as exclusive. Therefore, any explicit, implicit, or apparent benefit from the disclosure herein is expressly deemed as applicable to the present invention.

Rather than seeking to advance one media type over the other, the present invention provides a synergistic blending of the print and electronic media markets via a symbolic print to electronic media bridge system.

FIG. 1 illustrates an exemplary overview setting of a symbolic print to electronic media bridge 1, in which a printed publication 10 can be available to a user computer 31 communicatively connected to a system computer 21 via a computer network 2.

According to an exemplary embodiment of the present invention, a symbolic print to electronic media bridge system 1 can include a printed publication, a system agent, and a bridge agent.

In an exemplary aspect of the invention, as illustrated in FIG. 3, a printed publication 10, such as a book, magazine, catalog, etc., for example and not in limitation, can include one or more print media instances 11, with at least one of the one or more instances 11 being a particular instance 12 having a printed symbolic key representation 13 printed in association therewith, which can include an associated printing of the symbolic key representation relative to the particular instance.

Figure 5:
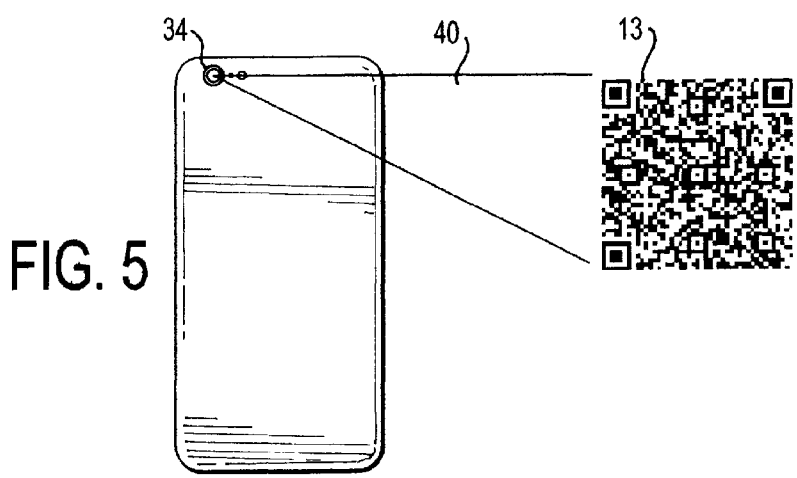
FIG. 5 illustrates an exemplary optical capture by an optical input device of a printed symbolic key representation.

In an exemplary aspect of the invention, a particular print media instance 12 can include any combination of printed text and printed images that visually conveys information, and thus, can include a newspaper or magazine article, an advertisement, etc., for example and not in limitation. In another exemplary aspect, a symbolic key representation 13 can include any type of symbol, such as a graphic, emblem, token, sign, character, representation, figure, image, etc., for example and not in limitation, that can represent, directly or indirectly, any one or more data instances utilizable as a primary key by itself or in conjunction with additional data and/or data processing (collectively, a "primary key"). In an exemplary embodiment, symbolic key representation 13 can be provided as a barcode, such as a QR Barcode, which is illustrated in FIGS. 3 and 5.

In a further exemplary aspect, system agent 20 can be provided as any desired combination of hardware, software, and firmware. And as illustrated in FIG. 2, system agent 20 can execute on a system computer 21 communicatively connected to computer network 2. Further, system computer can include a media database 22 having stored therein an electronic version 23 of print media instance 12 in association with primary key 24. Notably, media database 22 can include a respective electronic version 23 for one or more print media instances 11. Also notably, electronic version 23 can be provided in any desired format, such as Portable Document Format (pdf), text format, an audible format, etc., insofar as the same is functionally compatible with the present invention.

In another exemplary aspect, a bridge agent can be provided as any desired combination of hardware, software, and firmware. And as further illustrated in FIG. 2, bridge agent 30 can execute on a user computer 31 communicatively connected to computer network 2. As also illustrated, user computer 31 can include an output device 32 (such as a display, speaker, tactile device, etc., and any combination thereof, for example and not in limitation), a computer memory 33, and an optical input device 34 (such as a camera, for example and not in limitation).

Figures 4A, 4B:
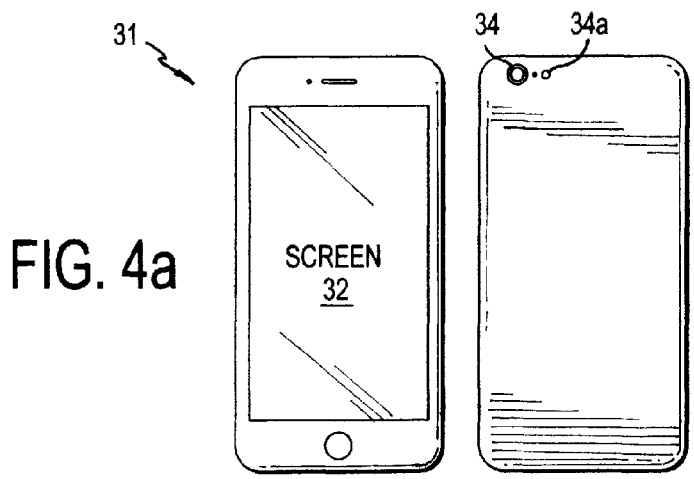
FIG. 4a illustrates a front view of an exemplary user computer provided as a smartphone having an output device provided as a touch screen.
FIG. 4b illustrates a rear view of an exemplary user computer provided as a smartphone having an optical input device provided as a camera.

FIGS. 4a and 4b illustrate an exemplary user computer 31 provided as a smartphone. FIG. 4a illustrates smartphone 31 having, on one side, an output device provided as a display screen 32, and FIG. 4b illustrates the smartphone having, on another side, an optical input device provided as a camera 34 with an optional light source 34a.

The following is an exemplary operation of the present invention. As illustrated in FIG. 5, optical input device 34 can be used to effectuate an optical capture 40 of a printed symbolic key representation 13. After such capturing, bridge agent 30 can extract primary key 24 from the captured data 40 and send the primary key to system agent 20 via computer network 2. After receipt, system agent 20 can reference electronic version 23 from media database 22 based on primary key 24, and thereafter send, via network 2, the electronic version to user computer 31, which can thereafter store the electronic version in computer memory 33 for subsequent output via output device 32.

As further illustrated in FIG. 2, system computer 21 can optionally include a user profile database 50 having stored therein a plurality of user profiles 51. Accordingly, within user profile database 50, system agent 20 can store user data (UD) in association with a particular user. Notably, user data UD can be provided and received from bridge agent 30 and/or determined by system agent 21 based on one or more events, such as an optical capture 40.

In yet another exemplary aspect, optionally, in response to an optical capture 40, bridge agent 30 can store, in computer memory 33, another instance of user data (UDI) associated with a particular user, where the other instance of user data UDI is received from system agent 20 or determined by bridge agent 30.

According to the present invention, any storage of data within system 1, including media database 22, user profile database 50, and computer memory 33, can be effectuated according to any logical schema and with any data structure and hardware desired, including but not limited to, a hierarchical, relational, object-oriented, and network schema, for example and not in limitation. Further, various elements of the present invention have been illustratively shown in conjunction with other elements, however, it is expressly contemplated that particular functionality, such as storage, processing, and communication of data, can be centralized or distributed to the extent desired insofar as the same is functionally consistent with the present invention.

In still another exemplary aspect of the present invention, any type of user data described herein can include any type of data relating, directly or indirectly, to a particular user, which can include, but is not limited to, the following: a user name; a user credential; contact information; a user metric (e.g., tendency, interest, disinterest, frequency, event time stamping, etc.); a user preference (e.g., preferred subject, author, publication, etc., whether user supplied or determined by system or bridge agent 20, 30); a user bookmark to or within a printed publication, print media instance, or electronic version; or a primary key associated with a particular user, publication, author, electronic version, or any taxonomic classification.

In still a further exemplary aspect, bridge agent 30 can optionally provide a sharing function, with which a particular user can forward via email, text message, social media posting (e.g., Facebook™, Twitter™, etc.), or any other social media or communication software/hardware combination, a primary key or other information relating to an electronic version to one or more third parties. Further, a bridge agent can provide a user with a bookmarking function, such that any particular position within an electronic version can be saved for subsequent sensing.

In still a further exemplary aspect of the present invention, bridge agent 30 can monitor a user's interactions with user computer 31 (including data entry by a user), and therewith can derive and store in computer memory 33 one or more instances of user data UDI that represent one or more user metrics, such as one or more of a user preference, tendency, action, selection of advertisements provided by one or more of the bridge agent, the server agent, and a third party, event time stamp, an order of events, etc. Additionally or alternatively, bridge agent 30 can communicate such user data to system agent 20, which can store the same in user profile database 50 as user data 51 and/or in media database 22 as metric data 25 pertaining to an electronic version.

In still an additional exemplary aspect, system agent 20 can derive metric data 25 and/or user data 51 based on primary key 24 and/or user data UID, and store the same in user profile database 50 as user data 51 and/or in media database 22 as metric data 25 pertaining to an electronic version.

It will be apparent to one of ordinary skill in the art that the manner of making and using the claimed invention has been adequately disclosed in the above-written and attached description of the exemplary embodiments and aspects of the present invention.

It should be understood, however, that the invention is not necessarily limited to the specific embodiments, aspects, arrangement, and components shown and described above, but may be susceptible to numerous variations within the scope of the invention.

Therefore, the specification and drawings are to be regarded in an illustrative and enabling, rather than a restrictive, sense.

Accordingly, it will be understood that the above description of the embodiments of the present invention are susceptible to various modifications, changes, and adaptations, and the same are intended to be comprehended within the meaning and range of equivalents apparent to one of ordinary skill in the art.

Therefore I claim:

1. A symbolic print to electronic media bridge system to facilitate information flow across a computer network, said system comprising:

a printed publication containing at least one print media instance, with a particular print media instance including a printed symbolic key representation printed in association with the particular print media instance;

a system agent executing on a system computer communicatively connected to the computer network, the system computer including a media database having stored therein an electronic version of the particular print media instance in association with a primary key represented by the symbolic key representation, and a user profile database having stored therein a plurality of user profiles;

a bridge agent executing on a user computer, associated with a user, and communicatively connected to the computer network, the user computer having an output device, a computer memory, and an optical input device configured to optically capture the printed symbolic key representation, said bridge agent being configured to provide via the output device an advertisement to the user and to derive an instance of user data based on user interaction with the advertisement;

wherein in response to an optical capture of the symbolic key representation via the optical input device, said bridge agent communicates, via the network, the primary key extracted from the optical capture of the symbolic key representation to said system agent, said system agent accesses the electronic version from the media database based on the primary key and communicates, via the network, the electronic version to the user computer, and the user computer stores the electronic version in the computer memory and outputs the electronic version via the output device, and wherein in response to receipt of the instance of user data from said bridge agent, said system agent stores the instance in one of the user profiles associated with the user.

2. The system of claim 1, wherein the instance of user data further includes one of the primary key and a time stamp associated with the particular user.

3. The system of claim 1, wherein in response to the optical capture of the symbolic key representation via the optical input device, said bridge agent stores, in the computer memory, another instance of user data associated with the particular user.

4. The system of claim 3, wherein the other instance of user data includes one of a user metric and a user preference.

5. The system of claim 1, wherein after receipt of the primary key, said system agent stores, in the media database, metric data.

6. The system of claim 5, wherein in response to the optical capture of the symbolic key representation via the optical input device, said bridge agent communicates, via the network, the metric data to said system agent.

7. The system of claim 1, wherein in response to the optical capture of the symbolic key representation via the optical input device, said bridge agent stores, in the computer memory, the instance of user data.

* * * * *